United States Patent [19]

Konomura et al.

[11] Patent Number: 4,845,553

[45] Date of Patent: Jul. 4, 1989

[54] IMAGE DATA COMPRESSING DEVICE FOR ENDOSCOPE

[75] Inventors: Yutaka Konomura, Tachikawa; Takao Tsuruoka, Hachioji, both of Japan

[73] Assignee: Olympus Optical Co., Ltd., Tokyo, Japan

[21] Appl. No.: 195,937

[22] Filed: May 19, 1988

[30] Foreign Application Priority Data

May 22, 1987 [JP] Japan .................. 62-123769

[51] Int. Cl.⁴ .................. A61B 1/04; H04N 7/18
[52] U.S. Cl. .................. 358/98; 358/138; 358/44
[58] Field of Search .................. 358/98, 138, 133, 12, 358/13, 44, 15

[56] References Cited

U.S. PATENT DOCUMENTS

| Re. 31,290 | 6/1983 | Moore et al. | 358/98 X |
|---|---|---|---|
| 3,507,981 | 4/1970 | Eilenberger | 358/12 |
| 4,339,771 | 7/1982 | Morishita et al. | 358/44 X |
| 4,633,303 | 12/1986 | Nagasaki et al. | 358/98 |
| 4,734,259 | 3/1988 | Kobori et al. | 358/44 X |

Primary Examiner—James J. Groody
Assistant Examiner—Victor R. Kostak
Attorney, Agent, or Firm—Armstrong, Nikaido Marmelstein Kubovcik & Murray

[57] ABSTRACT

Disclosed is an image data compressing device for an endoscope which is for use in converting a plurality of color signals obtained by separating the image provided by the endoscope into electrical signals and then quantizing and storing the thus-obtained signals. The image data compressing device includes sampling means for conducting sampling at sampling intervals which are different for each of the plurality of color signals and which correspond to the characteristics of each of the plurality of colors in the image obtained by the endoscope, so as to enable the image data to be compressed in accordance with the characteristics of each of the colors of the image provided by the endoscope.

In consequence, data compression can be conducted without losing the quality of the image provided by the endoscope.

5 Claims, 8 Drawing Sheets

RED

GREEN

BLUE

IMAGE DATA COMPRESSING DEVICE FOR ENDOSCOPE

BACKGROUND OF THE INVENTION

Field of the Invention

The present invention relates to an image data compressing device for an endoscope which is capable of compressing image data in accordance with the characteristic of each of the colors with respect to the color image provided by the endoscope.

In the known type of endoscope for providing color images which utilizes the field sequential color television system, the light of three primary colors such as red, green, and blue is sequentially irradiated onto an object such as an organism, and the reflected light of each of the individual colors is received by an imaging device such as a CCD where it is converted into an electrical signal. After the thus-obtained picture signals are stored in memories in succession, they are converted into color television signals by a processor to be displayed on a color monitor. This type of color endoscope utilizing the field sequential system was proposed, for example, in the specification of U.S. Pat. No. Re. 31290.

Figure 1:
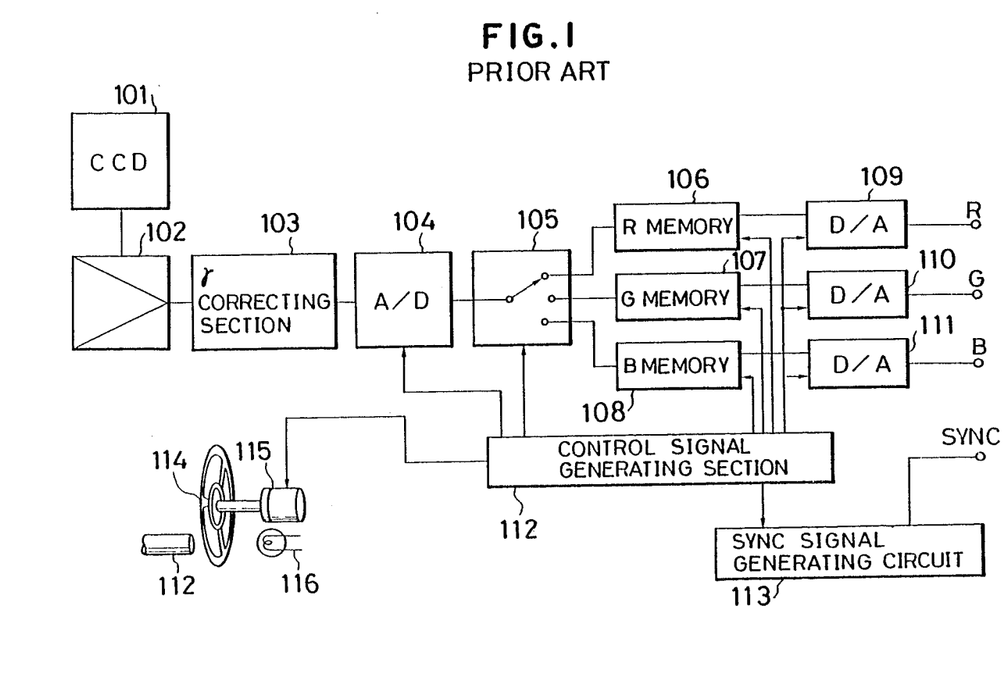
FIG. 1 is a block diagram of a known image inputting device for an endoscope.

Means for digitizing and storing color image signals of a type that can be used in the above-described color endoscope are known. In one example of such means, analog red, green, and blue picture signals provided by an image inputting device for an endoscope of the type shown in FIG. 1 are stored in a digital memory device of the type shown in FIG. 2 and incorporating a data compressing circuit. In this known image inputting device for an endoscope, as shown in FIG. 1, the light illuminated from a lamp 116 is decomposed into the three primary colors of red, green, and blue by a rotary filter 114, and the light of these three primary colors is sequentially made incident upon a light guide 117 so as to be irradiated onto an organism from the forward end of the light guide 117.

Visual image information on the organism is converted by a CCD 101 into electrical signals disposed at the forward end of the inserted portion of an endoscope, and these picture signals are input to an amplifier 102 where they are amplified to a predetermined voltage level. The amplified picture signals then enter a gamma correcting section 103 where they are gamma corrected. After the gamma corrected picture signals have been converted into digital signals by an analog/digital converter 104, they enter a switch-over switch 105 which is changed over by the control singals, and are then sequentially recorded in red, green, and blue image memories 106, 107, and 108. The picture signals contained in the red, green, and blue image memories 106, 107, and 108 are sequentially read out by the control signals from a control signal generating section 112, and are converted into analog signals by corresponding digital/analog converters 109, 110, and 111. Thereafter, the analog picture signals are fed to red, green, and blue picture signal output terminals together with the synchronizing signals from a synchronizing signal generating circuit 113.

Figure 2:
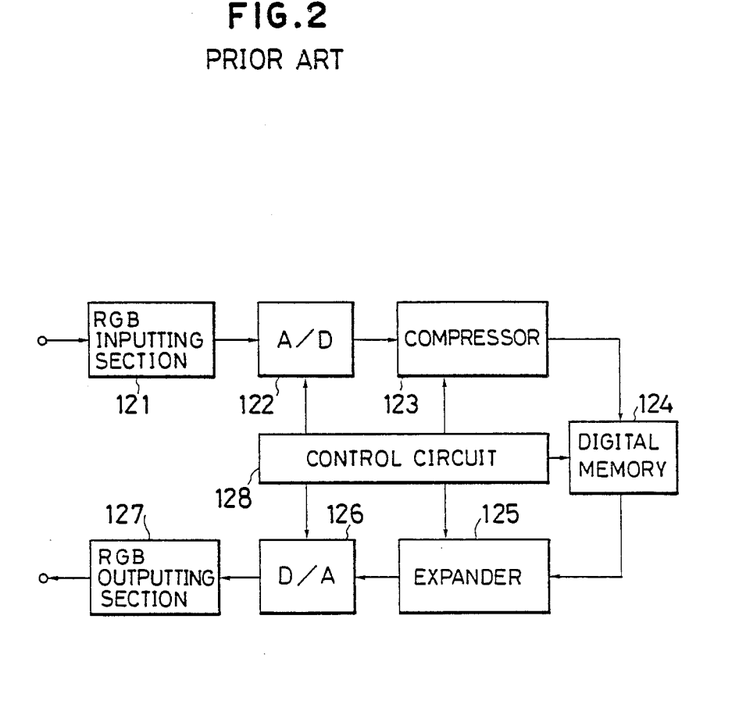
FIG. 2 is a block diagram of a known data compressing device connected to the image inputting device of FIG. 1.

Next, the thus-obtained red, green, and blue analog picture signals are input to a digital memory device such as that shown in FIG. 2 through a RGB inputting section 121. After they have been digitized by an analog/digital converter 122, they are compressed by a compressor 123, and are then stored in a digital memory 124. When the data is read out from the memory 124, the digital data stored in the digital memory 124 in a compressed form is first expanded by an expander 125, and is converted into an analog signal by a digital/analog converter 126, which is then fed to a RGB output section 127. This digital memory device also includes a control circuit 128 for supplying control signals to the various sections.

Compressors of a type that can be employed in the above-described digital memory device were proposed, for example, in the specification of Japanese Patent Laid-Open No. 243075/1987. The compressor of this type includes an operating circuit which employs complicated algorithms to compress data, and therefore provides compressed data through very complicated calculations.

SUMMARY OF THE INVENTION

The present invention is directed to overcoming the above-described problem of the known data compressing device for a digital memory device used to store the images provided by an endoscope, and its object is to provide a simple type of data compressing device which is capable of compressing data effectively by utilizing the characteristics of the images provided by an endoscope without the need for a complicated operating circuit necessary for data compression.

When the image provided by the endoscope is decomposed into the three primary colors of red, green, and blue, the spatial frequency distribution of the red component is not very high, that of the green component is relatively high as compared with that of the red component, and that of the blue component is a median value between those of the green and red components. It is not therefore necessary for the resolution of the red component to be increased but it is important that the resolution of the green component is improved.

The present invention is based on this fact and includes sampling means for sampling an image data at intervals of time which are different for each of a plurality of color signals, such that the data is compressed in accordance with the characteristics of each of the plurality of color signals, i.e., the spatial frequency distributions thereof.

With this arrangement, data can be compressed by a simple structure without employing a compressor based on complicated algorithms and without losing the quality of the image provided by the endoscope.

DESCRIPTION OF THE PREFERRED EMBODIMENTS

Figure 3:
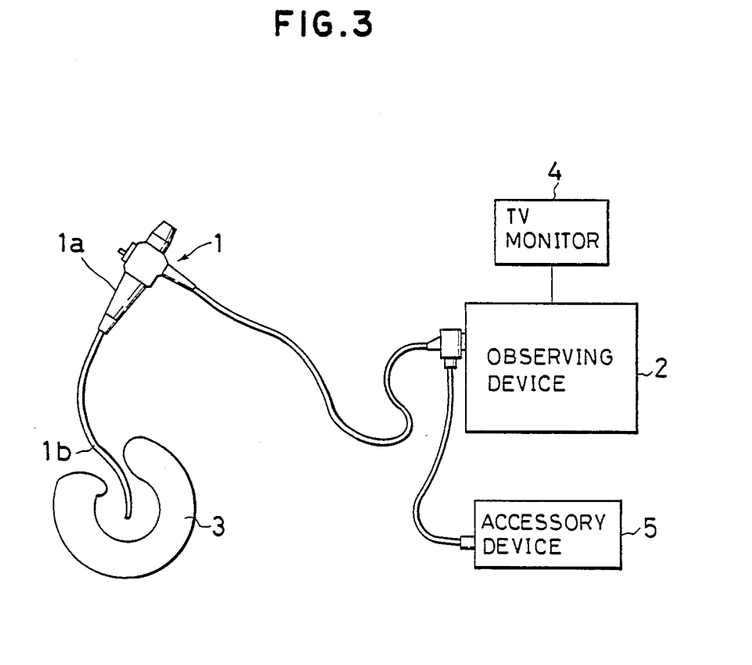
FIG. 3 is a schematic view of an endoscope to which an image data compressing device for an endoscope of the present invention can be applied.

Embodiments of the present invention are described below with reference to the accompanying drawings. Referring first to FIG. 3 which schematically shows an example of an endoscope to which a data compressing device for an endoscope according to the present invention is applied, an endoscope 1 has an endoscope body 1a connected to an observing device 2 incorporating an image data compressing device, and an inserted section 1b which is inserted into a cavity of an organism 3. A TV monitor 4 used for observing the image is connected to the observing device 2, and an accessory device 5 such as an evacuator is connected to the endoscope body 1a. Illumination light is supplied to the forward end of the inserted section 1b, and the visual image information obtained by irradiating the light onto the organism 3 is converted into electrical signals by an imaging device such as a CCD disposed at the forward end of the inserted section 1b. The electric signals are then converted into TV signals by the observing device 2 to be displayed on the TV monitor 4 for observation.

Figure 4:
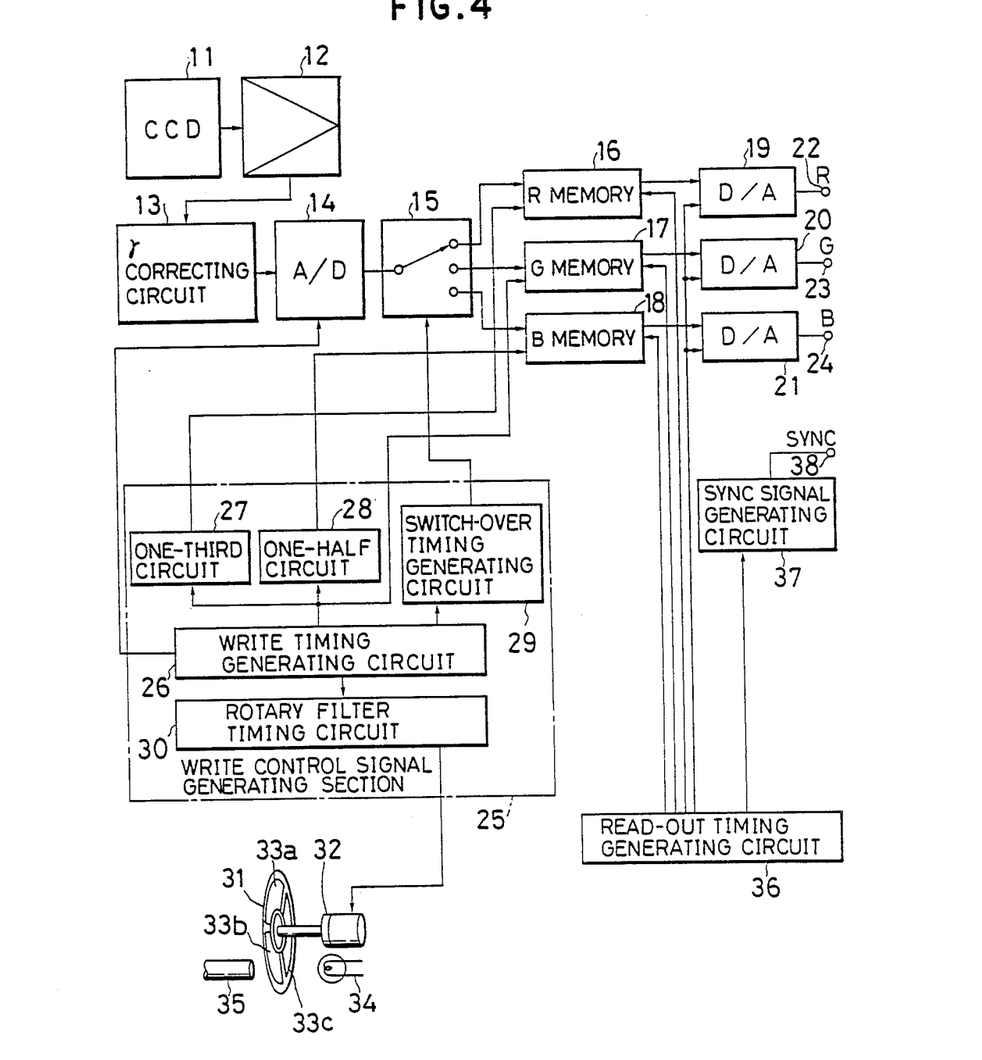
FIG. 4 is a block diagram of a first embodiment of the present invention.

FIG. 4 is a block diagram of a first embodiment of an image data compressing device for an endoscope according to the present invention. Image information on the organism 3 is converted into electrical signals by a CCD 11 disposed on the forward end of the inserted section 1b of the endoscope 1. The output signals from the CCD 11 are input to an amplifier 12, and the output signals from the amplifier 12 are then input to a gamma correcting circuit 13 where they are gamma corrected. After the gamma corrected picture signals have been converted into digital signals by an analog/digital converter 14, they are input to a switch-over switch 15. The switch-over switch 15 has three output terminals respectively connected to a R image memory 16, a G image memory 17, and a B image memory 18. The image memories 16, 17, and 18 are respectively connected to digital/analog converters 19, 20, and 21 whose output terminals are in turn connected to picture signal output terminals 22, 23, and 24, respectively.

A write control signal generating section 25 is adapted to control the writing of image data into the image memories 16, 17, and 18. It includes a write timing circuit 26 for producing basic timings, a one-third circuit 27, a one-half circuit 28, a switch-over timing generating circuit 29, and a rotary filter timing circuit 30. The write timing generating circuit 26 is adapted to deliver timing clocks to the analog/digital converter 14, the one-third circuit 27, the one-half circuit 28, the G image memory 17, the switch-over timing generating circuit 29, and the rotary filter timing circuit 30. The output of the one-third circuit 27 is connected to the R image memory 16, and the output of the one-half circuit 28 is connected to the B image memory 18. The output of the switch-over timing generating circuit 29 is connected to the switch-over switch 15. The output of the rotary filter timing circuit 30 is connected to a motor 32 for driving a RGB rotary filter 31.

The RGB rotary filter 31 has R, G, and B filters 33a, 33b, and 33c. The light irradiated from a lamp 34 which serves as a light source is made incident upon a light guide 35 through the RGB rotary filter 31, and is then led therethrough to the forward end of the inserted section 1b of the endoscope so as to irradiate the organism 3.

A read-out timing generating circuit 36 is connected to the R G B image memories 16, 17, and 18. It is also connected to a synchronizing signal generating circuit 37, which is in turn connected to a synchronizing signal outputting terminal 38.

Next, the operation of the thus-arranged image data compressing device of the endoscope will be described. As the motor control signal is applied from the rotary filter timing circuit 30 of the write control signal generating section 25 to the motor 32 for driving the RGB rotary filter 31, the motor 32 rotates the RGB rotary filter 31 at predetermined timings, by which the light illuminated from the lamp 34 is decomposed into red (R), green (G), and blue (B) primary colors, and is made incident upon the light guide 35 of the endoscope 1 so as to irradiate the organism 3 by what is called RGB field sequential color television system.

Visual image information on the organism 3 illuminated by the three primary colors is converted into electrical picture signals by the CCD 11, and the converted picture signals are amplified by the amplifier 12 to a voltage level within a predetermined range, e.g., to a voltage ranging between 0 V and 1 V. The amplified picture signals are input to the gamma correcting circuits 13, where they are gamma corrected. After the picture signals which have been corrected such that they have predetermined gamma characteristics are quantized by the analog/digital converter 14, for example, in 8-bit words, they are input to the switch-over switch 15. The switch-over switch 15 is changed over at the same timings as those in which the RGB rotary filter 31 is rotated by the signal from the switch-over timing generating circuit 29, by which the picture signal representing the image information accepted by the CCD 11 while the red (R) light is illuminated onto the object is input to the R image memory 16, the picture signal representing the image information obtained by the illumination of the green (G) light is input to the G image memory 17, and picture signal representing the image information obtained by the illumination of the blue (B) light is input to the B image memory 18, the red (R), green (G), and blue (B) color signals being input to their respective memories in that order.

Each of the image memories 16, 17, and 18 has independent input and output portions, so that inputting and outputting operations can be conducted at their own timings.

The R, G, and B picture signals recorded in the image memories 20, 21, and 22 are respectively transferred by the timing signal from the read-output timing generating section 36 to the digital/analog converters 19, 20, and 21 where they are converted into analog signals. The analog R, G, B picture signals are then respectively output to the R, G, and B picture signal output terminals 22, 23, and 24 together with the synchronizing signals output from the synchronizing signal generating circuit 37 to the synchronizing signal output terminal 38.

Recording of digital data representing color images in the image memories 16, 17, and 18 will be described below. The green (G) image data is fetched into the green image memory 17 in the manner described below: while the light is being illuminated onto the object through the G filter 33b of the RGB rotary filter 31, sampling clocks used to quantize the pixel data are fed at the same timing as the illumination of the light through the G filter from the write timing generating circuit 26 to the G image memory 17, by which means the G pixel data is fetched into the G image memory 17.

The B image data is fetched into the B image memory 18 while the light is being illuminated onto the object through the B filter 33c of the RGB rotary filter 31. In this case, the sampling clocks from the write timing generating circuit 26 are varied by the one-half circuit 28 in such a way as to ensure that the pixel data is sampled for every other dot. The R image data is fetched into the R image memory 16 while the light is being illuminated onto the object through the R filter 33a of the RGB rotary filter 31. In this case, the sampling clocks from the write timing generating circuit 26 are varied by the one-third circuit 27 in such a manner that it ensures that the pixel data is sampled once every three dots.

The image data stored in the RGB image memories 16, 17, and 18 is read out in the operation described below: the data is read out from the G image memory 17 when read-out clocks required for providing one screen are fed thereto from the read-out timing generating circuit 36. The data is read-out from the B image memory 18 by the read-out clocks which represent half of those fed to the G image memory 17. Similarly, the read-out of the data from the R image memory 16 is conducted by the clocks which represent one-third of those fed to the G image memory 17.

Figure 5:
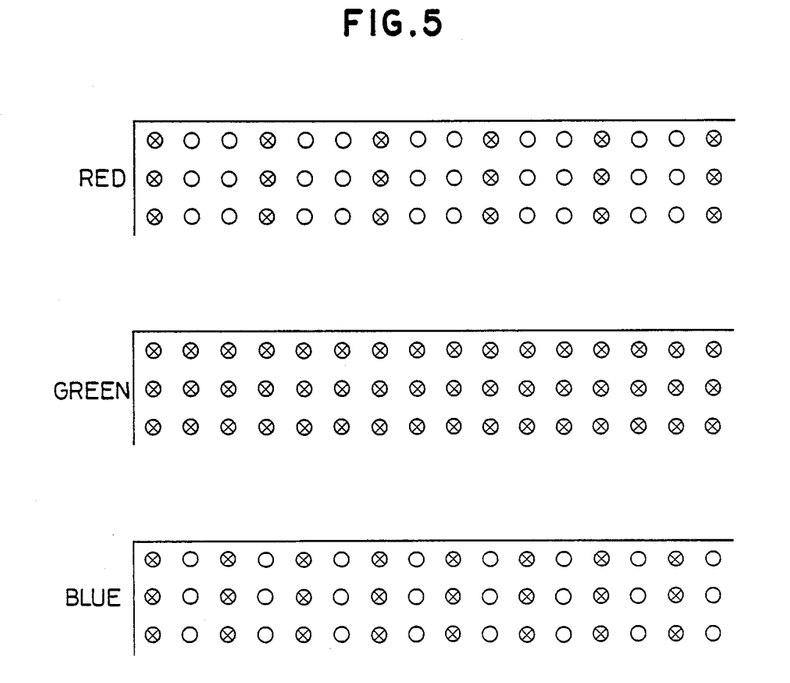
FIG. 5 shows how an image data is sampled in the first embodiment of the present invention.

FIG. 5 illustrates how image data is sampled. The mark ⊗ given to R, G, and B image data indicates a pixel to be sampled, and the mark ○ denotes those not to be sampled. From the illustration of FIG. 5, it is clear that the B image data is sampled at a sampling rate which is one half of that at which the G image data is sampled for data compression, and that the R image data is sampled at a rate which is one-third of that of the sampling of the G image data. This means that the memory capacity required for the B and R images can be respectively reduced to one half and one third of that needed in the prior art, and that the overall memory capacity can be therefore reduced to approximately one half of that needed in the prior art.

Figure 6:
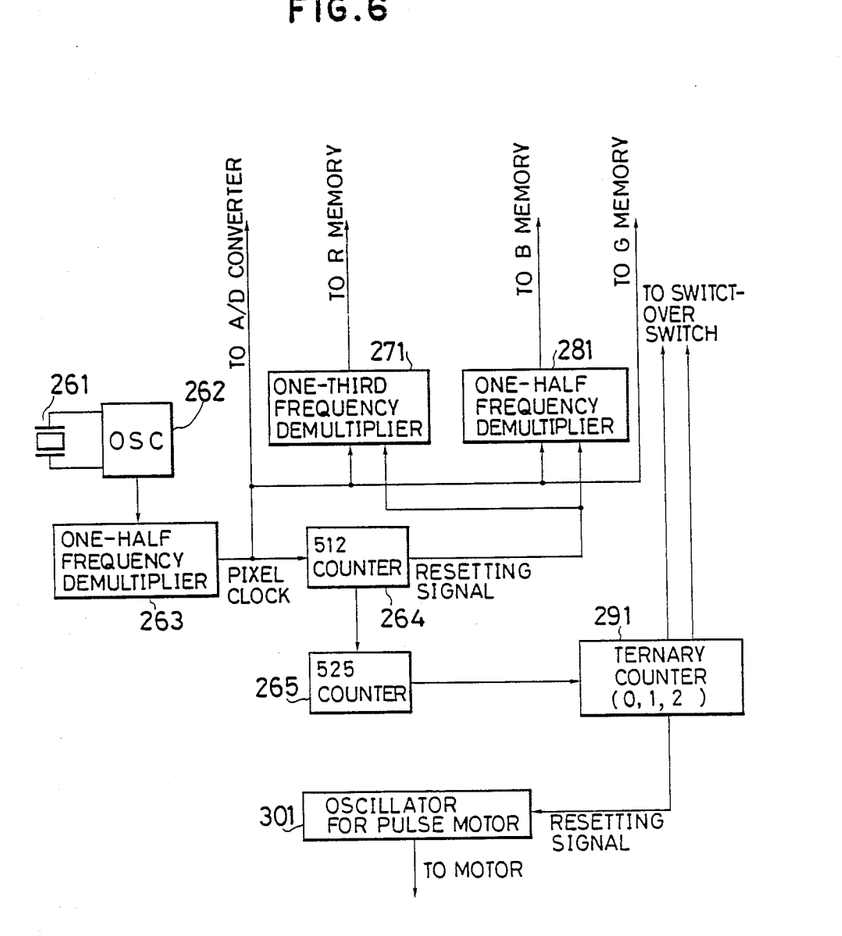
FIG. 6 shows an example of the detailed structure of a write control signal generating section.

FIG. 6 shows a detailed example of the structure of the write control signal generating section 25 shown in FIG. 4. In this example, the write timing generating circuit 26 shown in FIG. 4 is composed of a crystal oscillator 262 employing a crystal resonator of 18 MHz, a one-half frequency demultiplier 263 connected to the crystal oscillator 262, a "512" counter 264 connected to the one-half frequency demultiplier 263, and a "525" counter 265 connected to the counter 264. The write control signal generating section 25 includes, in addition to the above-described write timing generating circuit 26, a one-third frequency demultiplier 271 corresponding to the one-third circuit 27, a one-half frequency demultiplier 281 corresponding to the one-half circuit 28, a ternary counter 291 corresponding to the change-over timing generating circuit 29, and an oscillator 301 for a pulse motor which corresponds to the rotary filter timing circuit 30.

Pixel clocks are supplied from the one-half frequency demultiplier 263 connected to the oscillator 262 to the "512" counter 264, the analog/digital converter 14, the one-third frequency demultiplier 271, the one-half frequency demultiplier 281, and the G memory 17. The "512" counter receives the pixel clocks, and outputs resetting signals to the one-third frequency demultiplier 271 and the one-half frequency demultiplier 281. The output of the "525" counter 265 is input to the ternary counter 291, and the output of the ternary counter 291 is in turn input to the switch-over switch 15. The switch-over switch is changed over to the R memory when the output of the ternary counter 291 is zero, while it is changed over to the G and B memories, respectively, when the output of the ternary counter 291 is one and two, respectively. A resetting signal is fed from the ternary counter 291 to the oscillator 301 for the pulse motor every time the output of the ternary counter 291 is zero, whereupon the oscillator 301 feeds motor driving pulses to the motor 32 at the same timing at which the resetting signal is fed thereto.

Figure 7:
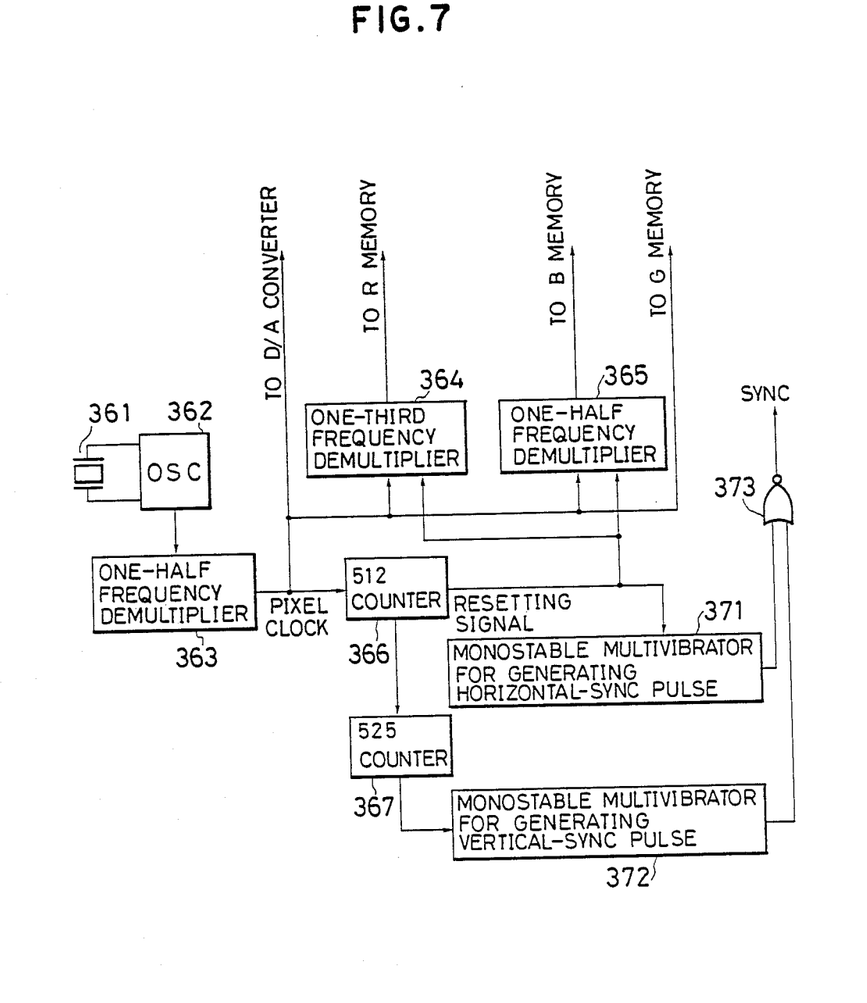
FIG. 7 shows an example of the detailed structure of a read-out timing generating circuit.

FIG. 7 shows a detailed example of the structure of the read-out timing generating circuit 36 and the synchronizing signal generating circuit 37 shown in FIG. 4. The read-out timing generating circuit 36 is composed of a crystal oscillator 362 employing a crystal resonator 361 of 18 MHz, a one-half frequency demultiplier 363 connected to the oscillator 362 and adapted to output pixel clocks, a one-third frequency demultiplier 364, a one-half frequency demultiplier 365, a "512" counter 366, and a "525" counter 367, the pixel clocks output from the one-half frequency demultiplier 363 being input to the one-third frequency demultiplier 364, one-half frequency demultiplier 365, and the "512" counter 366. The synchronizing signal generating circuit 37 is comprised of a monostable multivibrator 371 for generating horizontal-sync pulses, a monostable multivibrator 372 for generating vertical-sync pulses, and a NOR circuit 373 for outputting a synchronizing signal SYNC on receipt of the output of the monostable multivibrators 371 and 372. Pixel clocks from the one-half frequency demultiplier 363 are also fed to the digital-/analog converters 19, 20, and 21 and the G memory 17. The output of the "512" counter 366 is applied as a resetting signal to the one-third frequency demultipler 364 and the one-half frequency demultiplier 365, as well as to the monostable multivibrator 371 for generating the horizontal sync pulses. The output of the "525" counter 367 is fed to the monostable multivibrator 372 for generating the vertical sync pulses.

This embodiment relates to an image data compressing device for an endoscope of the type incorporated in the image inputting device of the endoscope. However, the present invention is not limited to this embodiment and includes an image data compressing device of the type provided separately from the image inputting device.

In the embodiment described above, the R and B image data which have been stored in a compressed form are not interpolated when output from the memory. However, they may optionally be linear or spline interpolated.

In the above-described embodiment, writing of data into the RGB image memories and read-out of data therefrom are conducted in an asynchronous fashion. However, the writing and read-out may optionally be done synchronously.

Figure 8:
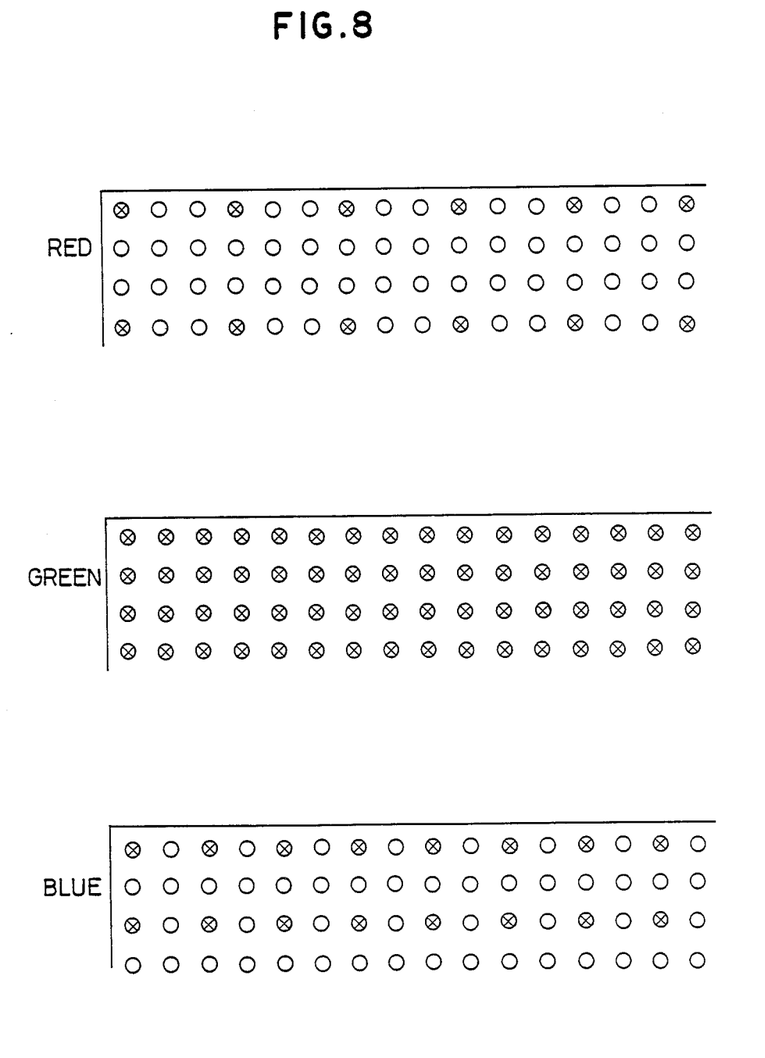
FIG. 8 shows another example of sampling of an image data.

In this embodiment, the image data is compressed by reducing the number of recorded data samples in the horizontal direction. However, it may be compressed by reducing it in the vertical direction or in both horizontal and vertical directions, as shown in FIG. 8, so as to further decrease the memory capacity.

The present embodiment employs three primary color signals of R, G, and B. However, the present invention is not limited to this and may employ RGB signals obtained by decoding composite video signals.

As will be understood from the foregoing description, in the present invention the data is compressed using simple means provided on the basis of the characteristics of the image obtained by the endoscope without employing any complicated algorithms. Therefore, the present invention makes it possible for the image data to be compressed easily and effectively without employing a complicated operating circuit while maintaining the characteristics of the image obtained by the endoscope.

What is claimed is:

1. An image data compressing device for an endoscope which is for use in converting a plurality of color signals obtained by separating the image provided by said endoscope into electrical signals and then quantizing and storing said signals, said image data compressing device being characterized by an inclusion of sampling means for conducting sampling at sampling intervals which are different for each of said plurality of color signals and which corresponds to the characteristics of each of said plurality of colors in the image obtained by said endoscope, such that image data are compressed in accordance with the characteristics of each of said colors in the image provided by said endoscope.

2. An image data compressing device for an endoscope according to claim 1, wherein said characteristics of each of said colors in said image provided by said endoscope are set on the basis of the spatial frequency distribution thereof.

3. An image data compressing device for an endoscope according to claim 1, wherein said color signals representing the image provided by said endoscope comprise three primary color signals of red, green and blue, and the sampling intervals for said R signal is large while those for said G and B signals are respectively small and a median value between those for said R and G signals.

4. An image data compressing device for an endoscope according to claim 3, wherein the sampling intervals for each of said color signals representing the image provided by said endoscope are made different in the horizontal and/or vertical direction.

5. An image data compressing device for an endoscope according to claim 3, wherein the pixel data of the R signal representing the image provided by said endoscope are sampled once every three dots by the sampling clocks that are passed through a one-third circuit, the pixel data of the G signal are sampled for each dot, and the pixel data of the B signal is sampled for every other dot by the sampling clocks that are passed through a one-half circuit.

* * * * *